(12) United States Patent
Lindkvist

(10) Patent No.: US 7,748,077 B2
(45) Date of Patent: Jul. 6, 2010

(54) WINDSHIELD WIPER ASSEMBLY

(75) Inventor: Anders Lindkvist, Askersund (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 11/422,086

(22) Filed: Jun. 4, 2006

(65) Prior Publication Data

US 2006/0265831 A1 Nov. 30, 2006

Related U.S. Application Data

(63) Continuation of application No. PCT/SE2004/001667, filed on Nov. 16, 2004.

(30) Foreign Application Priority Data

Dec. 3, 2003 (SE) .................................... 0303292

(51) Int. Cl.
 *B60S 1/18* (2006.01)
 *B60S 1/34* (2006.01)
(52) U.S. Cl. .............. 15/250.23; 15/250.21; 15/250.29; 296/190.1; 296/96.17
(58) Field of Classification Search .............. 15/250.23, 15/250.21, 250.29, 250.3, 250.13, 250.003; 296/96.17, 190.1
 See application file for complete search history.

(56) References Cited

U.S. PATENT DOCUMENTS 2,830,314 A * 4/1958 Bitzer ...................... 15/250.16
3,599,270 A * 8/1971 Mori ........................ 15/250.23
4,009,901 A * 3/1977 Barbee ..................... 296/190.1
4,675,933 A * 6/1987 Martin, Jr. ................. 15/250.3
6,065,179 A 5/2000 Hoshino

FOREIGN PATENT DOCUMENTS

| DE | 19742071 C1 | | 4/1999 |
|---|---|---|---|
| DE | 10010390 | * | 10/2000 |
| EP | 0779191 | * | 6/1997 |
| GB | 1190426 A | | 6/1970 |
| WO | 2005/054019 A1 | | 6/2005 |

OTHER PUBLICATIONS

International Search Report dated Mar. 7, 2005 from International Patent Application PCT/SE2004/001667 filed Nov. 16, 2004.

* cited by examiner

*Primary Examiner*—Gary K Graham
(74) *Attorney, Agent, or Firm*—Novak Druce + Quigg LLP

(57) ABSTRACT

A windscreen wiper with a link arm arrangement (4) including a first pair of arms (5) and a second pair of arms (6) to which the first pair of arms (5) is connected in such a way that they can pivot, the first pair of arms (5) being attached to a chassis in such a way that they can pivot and the second pair of arms (6) being attached to a windscreen wiper blade (7) in such way that they can pivot. The windscreen wiper further including an adjustment mechanism (8) for controlling the size of an angle between the first pair of arms (5) and the second pair of arms (6) in synchrony with the pivoting of the first pair of arms (5).

6 Claims, 6 Drawing Sheets

WINDSHIELD WIPER ASSEMBLY

CROSS REFERENCE TO RELATED APPLICATIONS

The present application is a continuation patent application of International Application No. PCT/SE2004/001667 filed 16 Nov. 2004 which is published in English pursuant to Article 21(2) of the Patent Cooperation Treaty and which claims priority to Swedish Application No. 0303292-7 filed 3 Dec. 2003. Said applications are expressly incorporated herein by reference in their entireties.

TECHNICAL FIELD

This invention relates to a windscreen wiper with a link arm arrangement comprising a first pair of arms and a second pair of arms to which the first pair of arms is connected in such a way that they can pivot, the first pair of arms being attached to a chassis in such a way that they can pivot, and the second pair of arms being attached to a windscreen wiper blade in such way that they can pivot. The invention also relates to a vehicle provided with a cab.

BACKGROUND OF THE INVENTION

The present invention has its origin in the need to wipe away water, dirt or the like from a windscreen on a vehicle. In an active operating position, an arrangement suited for the purpose should wipe as large a part of the windscreen as possible, and in an inactive resting position it should intrude as little as possible on the windscreen and into the field of vision of the operator of the vehicle.

A generally adopted way of attempting to meet the abovementioned need is to let a wiper blade carry out a pivoting movement across the windscreen. For this purpose, the wiper blade is suitably arranged centrally on the lower edge of the windscreen or centrally on the upper edge of the windscreen in such way that it can pivot. On account of the positioning and the design described, only a limited arc-shaped segment of the windscreen is wiped. The disadvantages of this type of design can be solved to a certain extent. One way is to use two wiper blades of the type described above, which are placed in such way that they can carry out a pivoting movement over separate areas of the windscreen. Another way is to let a single centrally arranged wiper blade also move radially forward and back relative to the point of attachment to the vehicle, during a pivoting movement. That is to say that in a radial direction the wiper blade follows, for example, a cam curve that partially corresponds to the shape of the windscreen. However, none of these solutions fulfills the abovementioned need in a satisfactory way. A large part of the windscreen remains unwiped by the wiper blade or blades.

A design which better fulfills the basic need comprises a wiper blade that is connected to two arms. The arms are arranged centrally at the lower edge of the windscreen or centrally at the upper edge of the windscreen. In addition, the arms are preferably parallel and pivot in a synchronized way. The design means that, during the whole pivoting sequence, the wiper blade moves parallel in a transverse direction to its main extent and in an arc across the windscreen. However, even with this design, there is still the disadvantage that a large part of the windscreen remains unwiped.

U.S. Pat. No. 6,065,179 shows an arrangement that is based partially upon the abovementioned concept. The document shows a wiper blade that moves parallel throughout the whole wiping sequence, with the wiper blade being almost as long as one of the dimensions of the windscreen and with the wiper blade being moved forward and back across the windscreen transverse to the direction of the main extent of the wiper blade. As a result of this design, more or less the whole windscreen is wiped. A disadvantage of the arrangement that is described in the document U.S. Pat. No. 6,065,179 is, however, that the arrangement takes up space outside and around the windscreen that is to be wiped. An additional disadvantage is that the wiper blade in the document rotates somewhat. The rotation means that the wiper blade does not move completely parallel throughout the whole wiping sequence. In addition, the wiper blade moves vertically up and down, which is not favorable as far as efficiency in wiping is concerned.

Modern working machines and similar vehicles are equipped with large windscreens which almost completely take up the whole front of the cab. The vehicles have also large side windows and roof windows which more or less merge into the windscreen, which means that the windscreen wiper must be more compact than the one shown in U.S. Pat. No. 6,065,179. A compact windscreen wiper means that it can be positioned in such a way that it does not intrude on the field of vision of the operator of the vehicle.

SUMMARY OF THE INVENTION

The present invention aims to solve the abovementioned need to wipe away water, dirt or like from a windscreen and, at the same time, it aims to avoid the disadvantages of previously known technology concerning both design and positioning, by describing an improved windscreen wiper. A primary object of the invention is to describe a compact design that can be positioned in such way that it is hidden away but which, in an active operating position, still wipes a large part of the windscreen. Another object of the invention is that the various points of attachment of the link arm arrangement to the vehicle's chassis are to be able to be located in the immediate vicinity of each other.

Another object is to present a link arm arrangement comprised in the windscreen wiper which, in an inactive resting position, is to be able to be folded away to the maximum extent without jamming.

In a first aspect, the invention relates to the windscreen wiper defined in the introduction, which is characterized in that the link arm arrangement comprises, in addition, a means for controlling the size of an angle between the first pair of arms and the second pair of arms. The characteristics described above mean that a wiper blade connected to the link arm arrangement is able to wipe more or less all the required area of the windscreen of the vehicle by being moved parallel forward and back over the windscreen, at right angles to the direction of the main extent of the wiper blade in an almost linear movement. The means for controlling the angle between the first pair of arms and the second pair of arms is preferably a control arm that is attached to the chassis in such way that it can pivot and is attached to one of the arms in the second pair of arms in such a way that it can pivot, with the windscreen wiper comprising a power source for the pivoting of the link arm arrangement.

In a second aspect, the invention also relates to the vehicle defined in the introduction, which is characterized in that it comprises a windscreen wiper according to the invention.

BRIEF DESCRIPTION OF DRAWINGS

In the following, for the purpose of exemplification, the invention will be described with reference to the attached drawings, in which.

DETAILED DESCRIPTION

Figure 1:
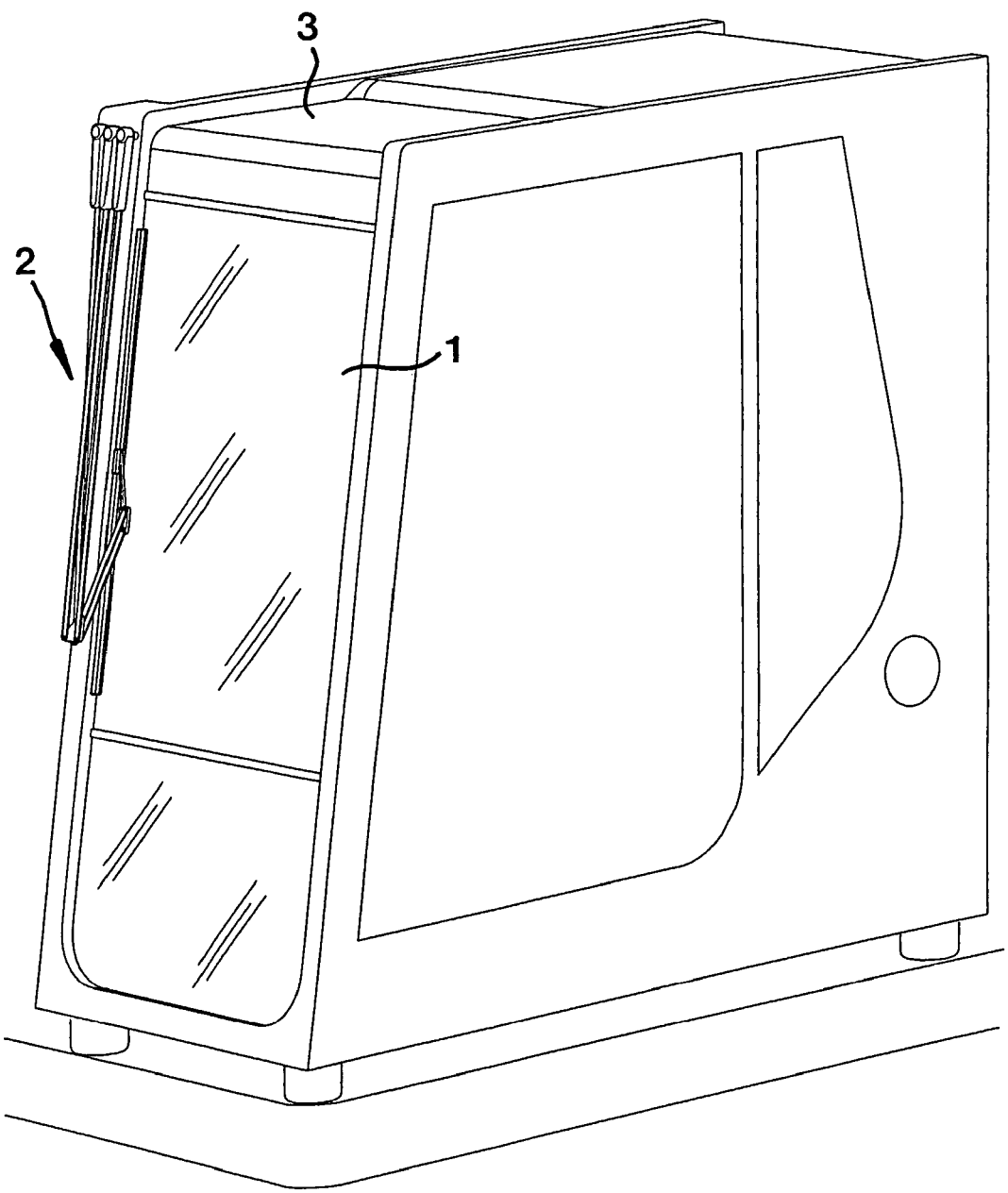
FIG. 1 is a perspective view of a cab from a working machine with a windscreen wiper in an inactive resting position.

FIG. 1 shows a vehicle cab. The cab consists preferably of a driver's cab for a vehicle, which preferably consists of a working machine. It is, however, recognized that the cab can also be intended for more persons than the driver and that the vehicle can be any type of vehicle with similar requirements and construction. The vehicle can, for example, consist of a wheeled loader, an excavator, a dumper, a tractor, a grader, a front loader or the like. The cab can also be intended for stationary use, including being placed on vehicle but intended for operation from a fixed position, such as when the cab is on a intended for operating the arm of a crane or the like and not for controlling the movement of the vehicle. The cab comprises a supporting shell of walls that extends between a floor and a roof.

The shell of the walls comprises, in addition, a windscreen 1 that is essentially rectangular. It should, however, be recognized that the invention is not restricted to rectangular windscreens 1, but that windscreens 1 that are other shapes are also covered by the invention. In particular, it relates to working machines with lifting arms or the like where the driver advantageously requires an unobstructed field of vision obliquely upward and forward. The cab in FIG. 1 comprises a windscreen wiper according to the present invention, generally designated 2, for wiping the windscreen 1. The vehicle comprises a chassis which, in turn, comprises the abovementioned cab. The cab can comprise any type of front side pillars that are located at both front corners of the cab and extend between the roof of the cab and the floor of the cab.

The windscreen wiper 2 is attached to the chassis of the vehicle in the vicinity of one of the ends of the side pillars, preferably at an upper end. On vehicles that do not have front side pillars, that is to say where the windscreen 1 merges into or adjoins a side window at the corner of the cab, it is still preferable to attach the windscreen wiper 2 in the vicinity of one corner of the cab, preferably in an upper corner. Where the windscreen wiper 2 is attached to the chassis of the vehicle, there is also a power source (not shown), for example an electric motor, for moving the windscreen wiper 2. As a result of this positioning, the field of vision of the operator of the vehicle can be increased in comparison with previously known technology. As the cab does not need transverse beams or the like for housing a power source for the windscreen wiper 2 and/or an attachment point for the windscreen wiper 2, the windscreen 1 can be extended downward and, at the same time, at the top, the windscreen 1 can merge into a roof window 3.

Figure 2:
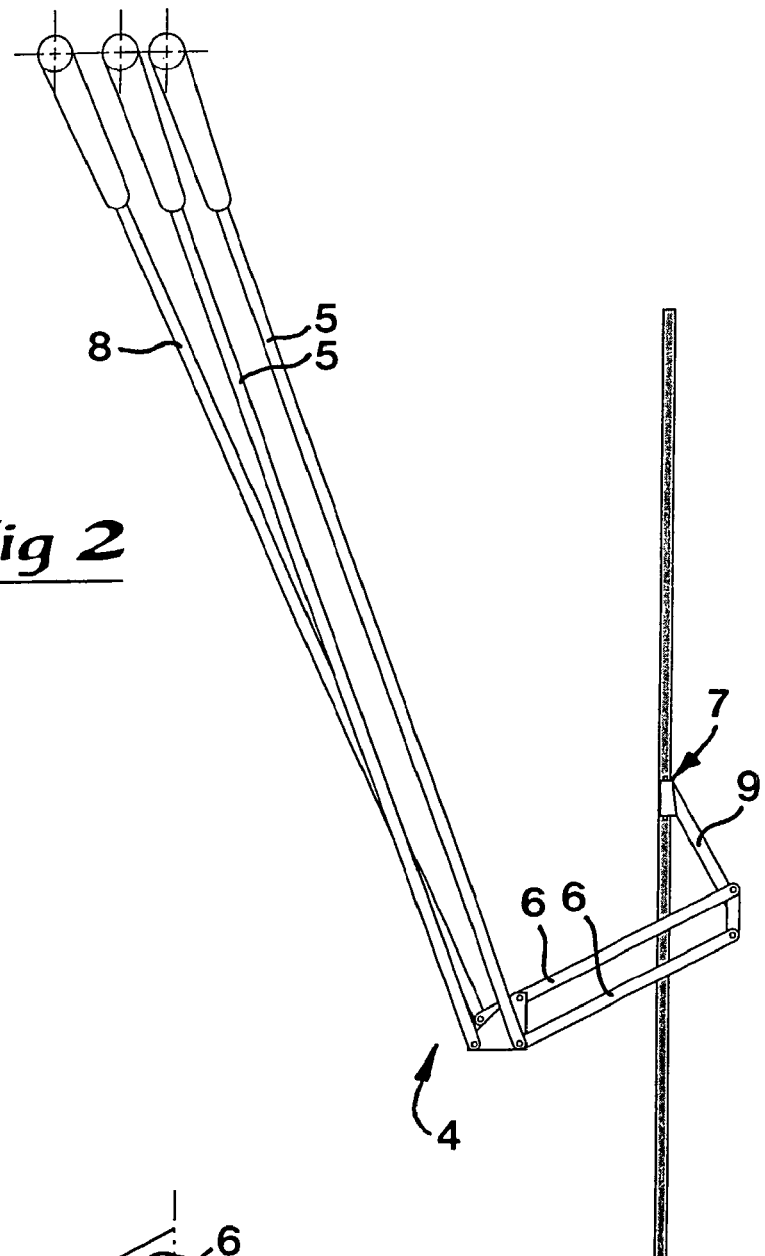
FIG. 2 is a plan view of a link arm arrangement according to the invention.

In FIG. 2, a link arm arrangement 4 of the windscreen wiper 2 has been removed from the cab. The link arm arrangement 4 comprises a first pair of arms 5 and a second pair of arms 6 to which the first pair of arms 5 is attached in such a way that they can pivot. The first pair of arms 5 is attached to the chassis of the working machine in such a way that they can pivot and the second pair of arms 6 is attached to a first element 7 in such way that they can pivot. The first element 7 can consist of a wiper blade or of several closely arranged wiper blades. In addition, the link arm arrangement 4 comprises a means 8 for controlling the size of an angle between the first pair of arms 5 and the second pair of arms 6. The angle between the two pairs of arms 5, 6 is controlled preferably on the basis of the angle of rotation of the first pair of arms 5 relative to the chassis. The link arm arrangement 4 is preferably attached to existing parts of the chassis of the working machine. It should, however, be recognized that it can also be attached to a separate element (not shown) which, in turn, is attached to the chassis of the vehicle. The element can also house the power source (not shown) for the windscreen wiper 2.

In the preferred embodiment, the second pair of arms 6 is connected to the wiper blade 7 via an arm 9. The arm 9 is attached to the wiper blade 7 or forms part of the same. In addition, the wiper blade 7 is attached to the arm 9 in such way that it cannot pivot. Each of the arms in the second pair of arms 6 is attached to the arm 9 in such way that it can pivot. It should be recognized that the arm 9 can be omitted and that the second pair of arms 6 can be attached directly to the wiper blade 7 in such a way that they can pivot. The proposed solution is, however, preferable. The arm 9 extends in a transverse direction away from the wiper blade 7 in the direction away from the first pair of arms 5. This design makes it possible for the windscreen wiper 2 to move the wiper blade 7 the whole way out toward the edges of the windscreen 1 that are closest to the attachment of the windscreen wiper 2 to the chassis, while at the same time the link arm arrangement 4 does not protrude outside the cab and does not jam.

Figure 3:
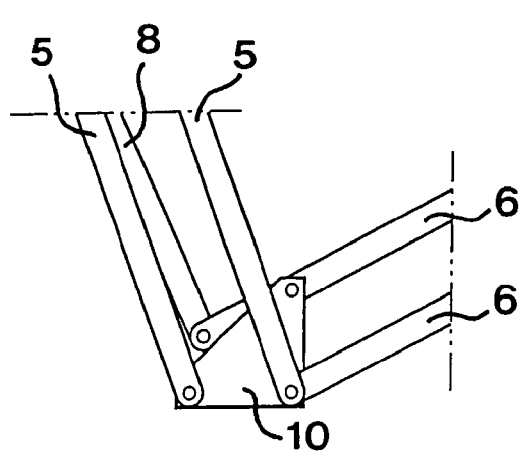
FIG. 3 is an enlarged plan view of a part of the link arm arrangement.

Reference is now also made to FIG. 3. The first pair of arms 5 is connected to the second pair of arms 6, via a second element 10, in such a way that they can pivot. In a preferred embodiment, the arms in the first pair of arms 5 are parallel and are equal lengths and the arms in the second pair of arms 6 are parallel and are equal lengths. The fact that the pairs of arms are parallel and are equal lengths ensures that the wiper blade 7 does not pivot when the link arm arrangement 4 pivots. In other words, the distance between the pivot points of the first pair of arms 5 on the chassis and the distance between the pivot points of the first pair of arms 5 on the second element 10 are the same.

At the same time, the distance between the pivot points of the second pair of arms 6 on the second element 10 and the distance between the pivot points of the second pair of arms 6 on the first element 7 are the same. The equal distances for the two pairs of arms 5, 6 are constant and independent of the angle of rotation between the first pair of arms 5 and the chassis. In a preferred embodiment that is shown in the drawings, an imaginary line through the points of attachment of the first pair of arms 5 on the second element 10 is perpendicular to an imaginary line through the points of attachment of the second pair of arms 6 on the second element 10.

The invention is not, however, limited to the angle between the above mentioned imaginary lines being a right angle. The angle can be more obtuse or more acute. According to a preferred embodiment, the second element 10 consists of a plate that is essentially triangular in shape. Both the first pair of arms 5 and the second pair of arms 6 are attached to the plate in such a way that they can pivot. The second element 10 can, however, consist of a number of separate elements that connect the first pair of arms 5 and the second pair of arms 6, provided that the relative location of the fixing points is unambiguously determined. It should also be pointed out that the shape of the second element 10 is not limited to the abovementioned essentially triangular shape.

In a preferred embodiment of the invention, the wiper blade 7 extends vertically up and down. In addition, the wiper blade 7 moves horizontally from left to right, or vice versa. The wiper blade 7 can, however, extend in any predetermined angle to the horizontal plane, without affecting the concept of the invention. It should also be recognized that the windscreen can incline inward toward or outward away from the operator of the vehicle without affecting the design of the link arm arrangement. Consequently, the expression vertical in this description is to be interpreted on the basis of viewing the windscreen 1 at right angles to the same.

In a preferred embodiment, the abovementioned means 8 for controlling the size of the angle between the first pair of arms 5 and the second pair of arms 6 is a control arm. The control arm 8 is attached to the chassis in such way that it can pivot and is connected to one of the arms in the second pair of arms 6 in such a way that it can pivot. In the preferred embodiment of the link arm arrangement 2 that is illustrated in the figures, the control arm 8 is connected to one arm of the second pair of arms 6 in the vicinity of the end of the arm, in such a way that it can pivot. At the same time, the other end of the arm is attached to the wiper blade 7 in such a way that it can pivot. Between these two points of attachment, the arm is connected to the second element 10 in such a way that it can pivot. An expert within the field will, however, recognize that other configurations are possible, depending upon where the control arm 8 is attached to the chassis of the vehicle.

The control of the size of the angle can be carried out in alternative ways within the framework of the invention. The first alternative way is to replace the control arm 8 by a belt control (not shown), in which a first belt wheel, cog wheel or the like is attached to the chassis and a second wheel is attached to one of the arms in the second pair of arms 6. A belt runs between the wheels, preferably a toothed belt or a V-belt. When the first pair of arms 5 pivots relative to the chassis, the belt causes the second wheel to rotate. The rotation of the second wheel controls the size of the angle between the first pair of arms 5 and the second pair of arms 6. By means of suitable gearing between the belt wheels, which can also be oval and/or eccentric in shape, an almost linear movement of the wiper blade 7 can be achieved. Linear movement, as used hereinabove, means that the point of attachment of the second pair of arms 6 to the wiper blade 7 moves parallel to the main direction of movement of the wiper blade 7 and moves only slightly or not at all in the direction of the main extent of the wiper blade 7.

The control of the size of the angle between the first pair of arms 5 and the second pair of arms 6 can also be realized by connecting a separate power source (not shown) to the second pair of arms 6, for example a stepping motor or a server motor that is located on the second element 10. This separate power source can, for example, be controlled by measuring the angle of rotation of the first pair of arms 5 relative to the chassis.

A third alternative embodiment for the control of the angle is implemented by having a telescopic function in one or several of the arms in the first pair of arms 5 and/or in the second pair of arms 6. During operation, their length is synchronized with the pivoting of the link arm arrangement 4. The change in length can, for example, be carried out by cog teeth mechanisms and/or screw mechanisms that are connected to movable parts of the arms concerned.

Figure 4:
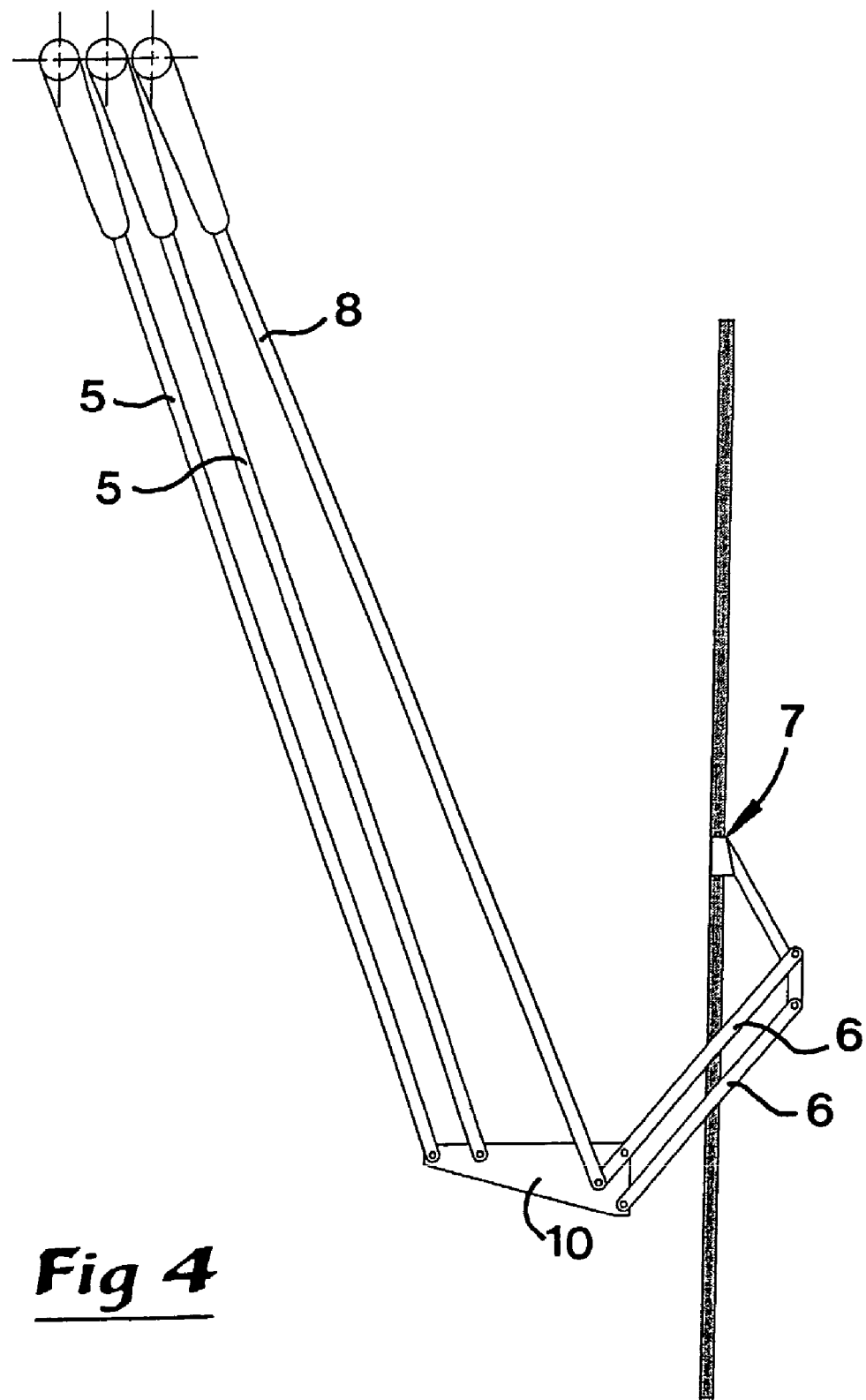
FIG. 4 is a plan view of an alternative embodiment of a link arm arrangement according to the invention.

FIG. 4 shows an alternative embodiment of the second element 10, which connects the first pair of arms 5 to the second pair of arms 6. In this alternative embodiment, the second element 10 also consists of a plate that is basically triangular in shape. It should be pointed out again that the shape of the plate is of no significance, other than that it should not obscure the field of vision of the operator of the vehicle more than necessary, and that the attachment of the arms is unambiguously determined.

Figure 5:
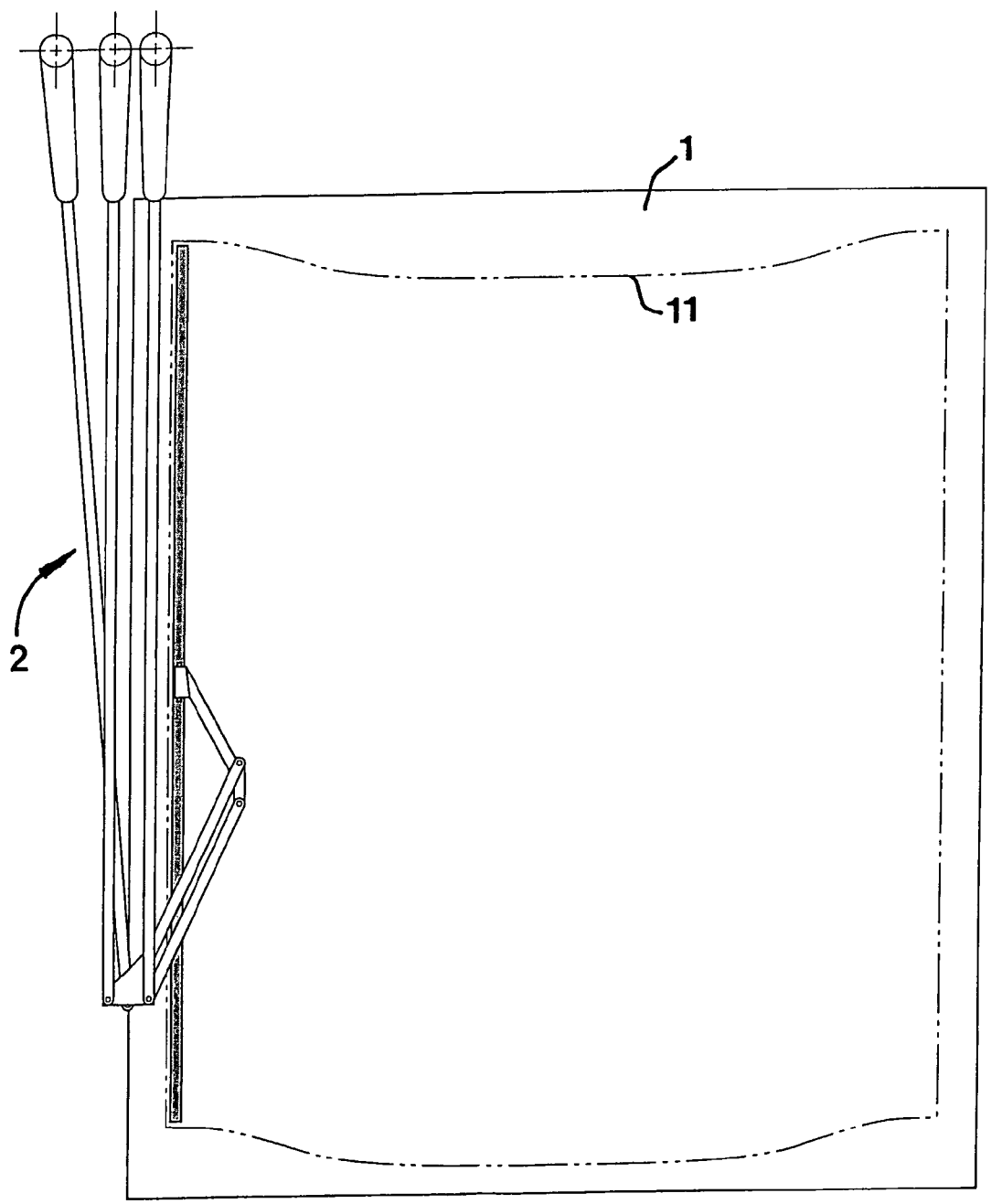
FIG. 5 is a plan view, from directly in front, of a windscreen and a windscreen wiper which is in an inactive resting position.
Figure 6:
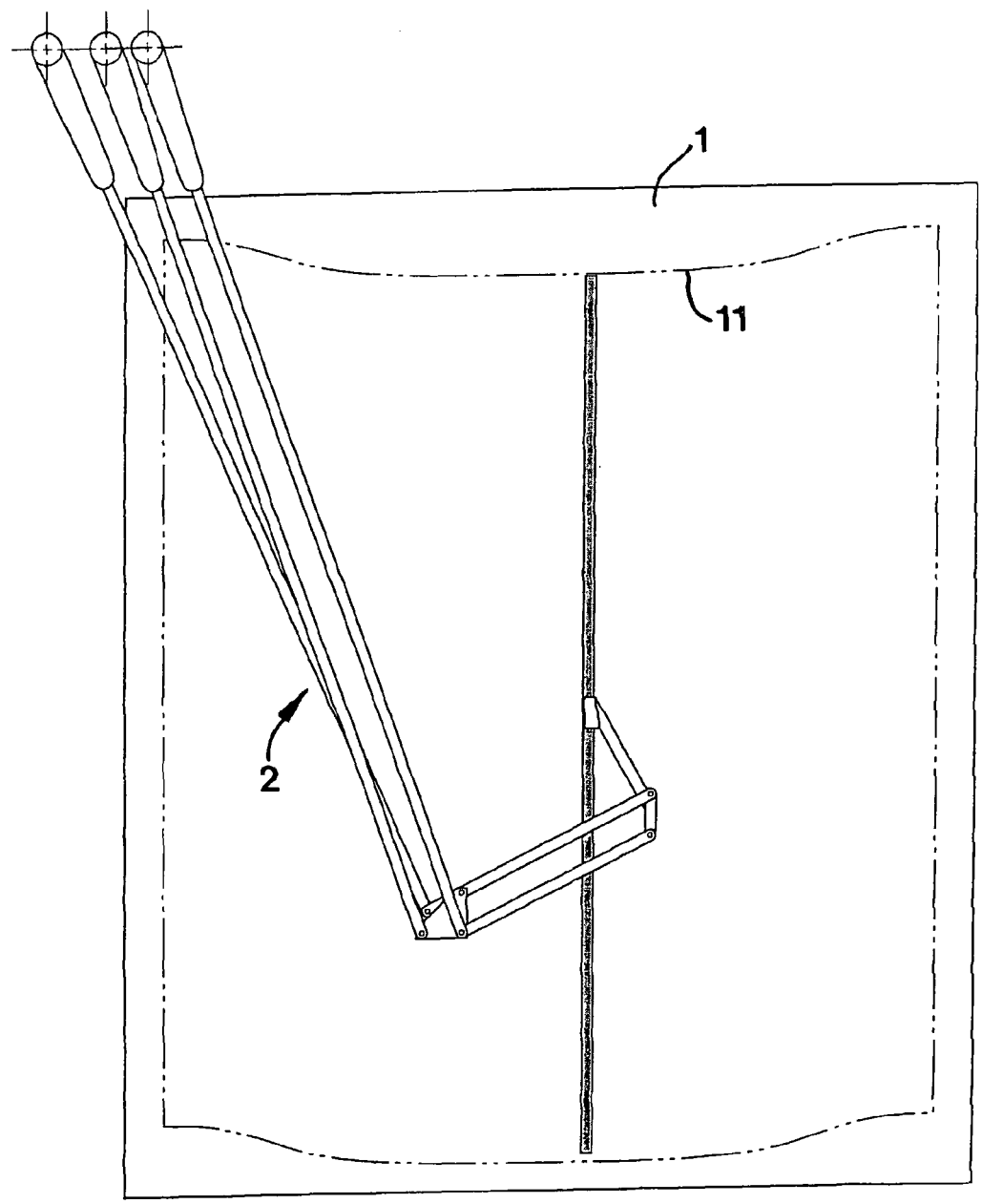
FIG. 6 is a plan view, from directly in front, of a windscreen and a windscreen wiper which is in an active operating position halfway between its two end positions.
Figure 7:
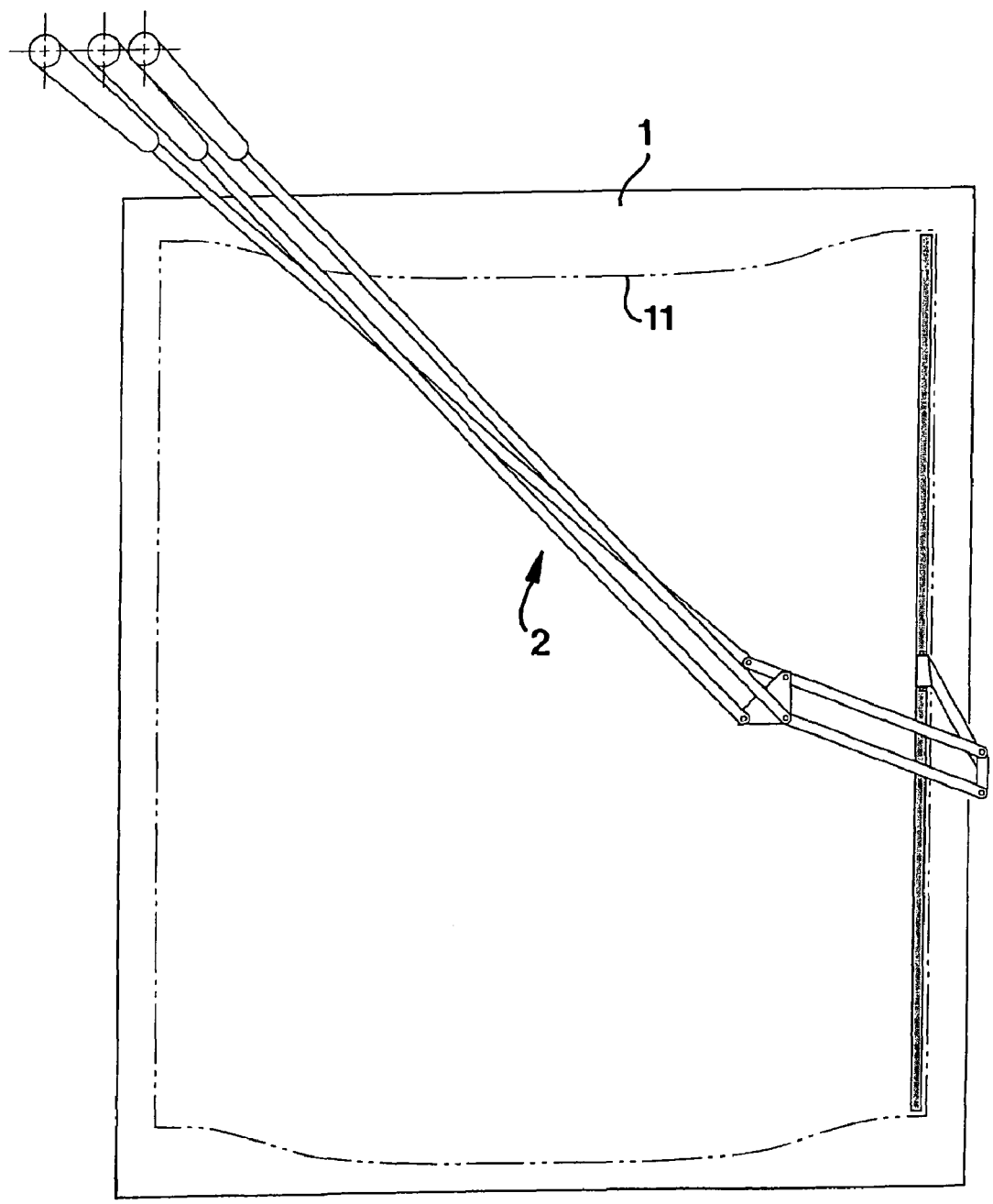
FIG. 7 is a plan view, from directly in front, of a windscreen and a windscreen wiper which is in an inactive operating position at its furthest end position.

FIGS. 5, 6 and 7 in combination show how the link arm arrangement 4 operates under a normal operating sequence and the area of the windscreen 1 that is wiped. FIG. 5 shows the windscreen wiper 2 in an inactive resting position, the position that the windscreen wiper 2 assumes when it is not in use or alternatively in a position when it is changing direction. FIG. 6 shows the windscreen wiper 2 in an active operating position, halfway between its two end positions. FIG. 7 shows the windscreen wiper 2 in an inactive operating position at its furthermost end position. In the preferred embodiment of the invention, where the means for controlling the size of the angle between the first pair of arms 5 and the second pair of arms 6 is a control arm 8, the wiper blade 7 moves between the two end positions of the windscreen wiper 2 in a slightly wave-shaped path 11. However, the windscreen wiper 2 wipes a sufficiently large area of the windscreen 1 for the field of vision of the operator of the vehicle to be adequate. Suitable geometries and, where appropriate, gearing in the selected angle control arrangement can, however, mean that the wiper blade 7 moves in a more linear path between the two end positions of the windscreen wiper 2.

The invention is not limited solely to the embodiment described above and illustrated in the drawings. The link arm arrangement can thus be modified in many ways within the framework of the following patent claims. It should be recognized that the windscreen wiper can be located on all the windows of a cab and not just on the window that faces in the direction of travel.

What is claimed is:

1. A vehicle chassis, comprising:
   a cab with an essentially rectangular windscreen that has left and right lateral edges, and
   a windscreen wiper (2) with a link arm arrangement (4) comprising a first pair of arms (5) and a second pair of arms (6) to which the first pair of arms (5) is connected in such a way that they can pivot,
   wherein the first pair of arms (5) is attached to the chassis at a location that is laterally outboard of one of the lateral edges of the windscreen and generally near an upper or lower corner of the windscreen and in such a way that they can pivot, and the second pair of arms (6) is attached to a generally vertically oriented windscreen wiper blade (7) in such way that they can pivot,
   wherein the link arm arrangement further comprises a means (8) for controlling the size of an angle between the first pair of arms (5) and the second pair of arms (6), and
   wherein the link arm arrangement (4) is arranged such that 1) the windscreen wiper is moved from near the lateral edge of the windscreen outboard of which the first pair of arms (5) is mounted generally horizontally across the windscreen toward the other, opposite lateral edge of the windscreen as the first pair of arms (5) is pivoted; and 2) the windscreen wiper is folded away from the field of vision of an operator in the cab along the lateral edge of the windscreen outboard of which the first pair of arms (5) is mounted when the windscreen wiper is in an inactive resting position.

2. The vehicle chassis as recited in claim 1, wherein the means (8) for controlling the size of the angle between the first pair of arms (5) and the second pair of arms (6) is a control arm (8) that is attached to the chassis in such a way that it can pivot and is attached to one of the arms in the second pair of arms (6) in such a way that it can pivot.

3. The vehicle chassis as recited in claim 1, further comprising a second element (10) providing a pivotal connection between the first pair of arms (5) and the second pair of arms (6).

4. The vehicle chassis as recited in claim 1, wherein the arms in the first pair of arms (5) are parallel.

5. The vehicle chassis as recited in claim 1, wherein the arms in the second pair of arms (6) are parallel.

6. The vehicle chassis as recited in claim 1, wherein a power source is attached to at least one part of the link arm arrangement (4) which is attached to the chassis.

* * * * *